Oct. 9, 1962 J. R. SUCHER 3,057,017
BUTTON MANUFACTURE
Original Filed March 18, 1952
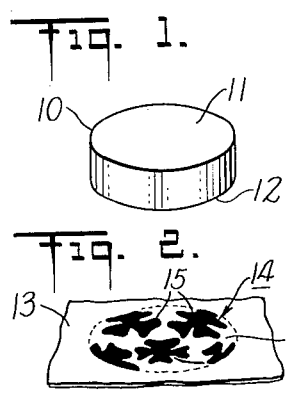
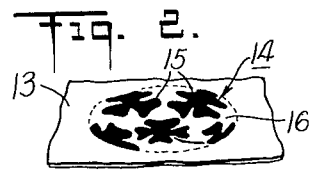
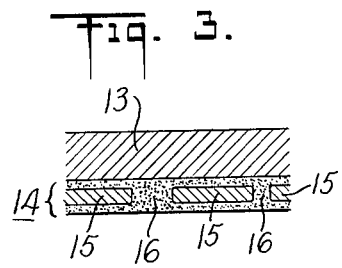
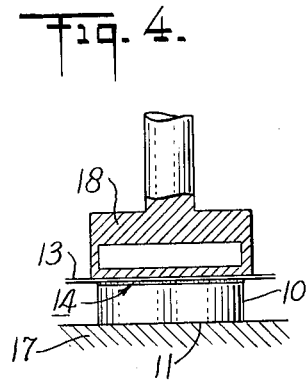
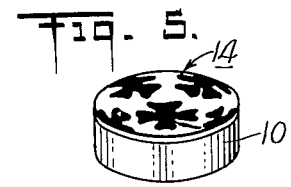
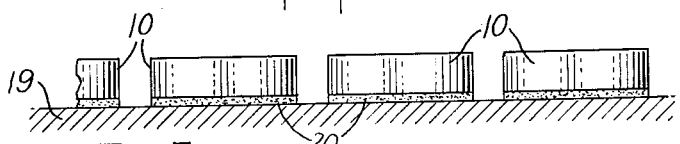
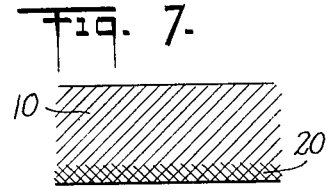
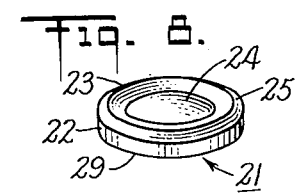
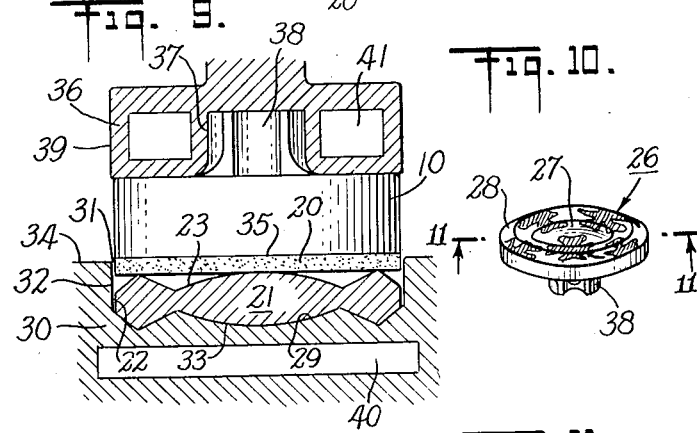
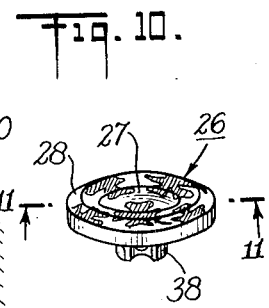
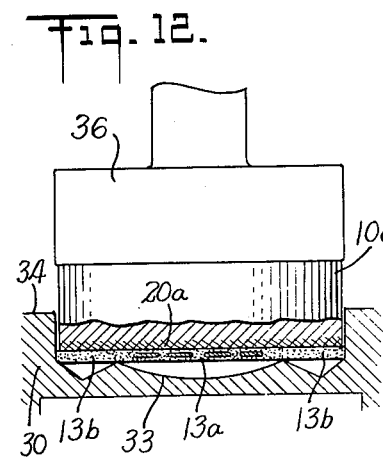
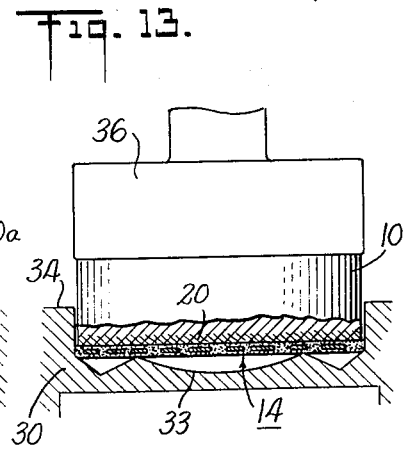
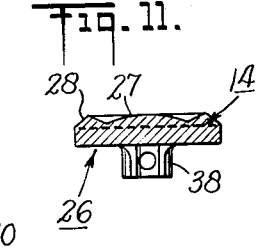
INVENTOR
Joseph R. Sucher
ATTORNEY

United States Patent Office 3,057,017
Patented Oct. 9, 1962

3,057,017
BUTTON MANUFACTURE
Joseph Robert Sucher, Woodmere, N.Y.
Continuation of application Ser. No. 277,183, Mar. 18, 1952. This application Feb. 12, 1959, Ser. No. 792,907
10 Claims. (Cl. 18—59)

This invention relates to methods for the making of buttons and like molded articles to provide the same with an ornamental or decorative design, for the result-products and apparatus therefor.

This application is a continuation of my application Serial No. 277,183, filed March 18, 1952, allowed December 15, 1958 and thereafter forfeited.

It is an object of this invention to provide a molded article with a decorative facing from molding powders of thermo-setting molding compounds, of which the potentially reactive heat settable phenolic aldehyde synthetic resins or urea aldehyde or melamine aldehyde synthetic resinous compounds are examples.

Specifically, it is an object of this invention to provide a procedure for molding pellet-like objects, such as buttons, and to provide the same with a decorative design of pigmented material, metallic foil in such forms as are usually graphically impressed by printing, inlaying or transfer processes.

Known to me is the attempt to apply decorative designs to the face of molded articles made from thermo-setting molding powder, such as those which are employed in making buttons, by steps which include inter-positioning between the male and female portions of the mold a pellet of a thermo-setting molding mixture to which, on one face thereof, a design is applied by consolidating a sheet on which the design is impressed with the pelleted charge of thermo-setting molding powder. Such procedure, which deforms the molding powder into the outlines of the cooperative portions of the die, distorts the carrier over which the decorative design is imposed, to result in a union of elements of indeterminate contour. Likewise, the facing produced by such method is not very durable and the decorative impression readily abraded in the tumbling and cleaning-up operations to which the molded product is subjected after leaving the treatment in the molding press.

Likewise, in the foregoing procedure, where it is desired to over-lay the decorative design with a resistant facing, the fusion incident to heat and pressure to conform the charge to the mold serves further to distort the design of predetermined outline, especially in making the facings of buttons which are grooved or similarly contoured on the exposed face, to present an exposed face with curved rims or edges, of the character which is recognized to be a desirable contour for articles of this character.

Since it is economically desirable to contour the charge for forming the button and in instances to drill and tumble the resultant molded charge, the selection of molding mixtures of dissimilar characteristics, such as one which is more machinable as contrasted with one which has greater abrading resistance, the problem of differential fusibility of these charges has further discouraged the production of buttons or like moldable material in which the decorative facing as well as the body of the charge is simultaneously subjected to heat and pressure in molding to the desired contour.

Accordingly, it is an object of this invention to provide a procedure for molding by heat and pressure a moldable charge such as thermo-setting, molding powders and to form simultaneously with the molding operation, an interfusion of a decorative facing by an intermediate treatment of the charge and a control of the flow of the charge to minimize distortion of a predetermined design and under conditions additionally to include a protective facing which augments the brilliancy and decorative effect of the design.

Still more particularly it is an object of this invention to provide a procedure for the production of buttons or the like moldable material from molding mixtures comprising synthetic resinous materails which are thermally set to the irreversibly fusible state, such as by the employment of the potentially reactive phenol formaldehyde reactive resinous materials capable of being hardened under heat and pressure to the thermally infusible state, of which synthetic resinous materials, the phenol formaldehyde resins, urea aldehyde, melamine and like thermo-setting compounds in the form of molding powder preformed to a pellet state are employed.

It is an object of this invention to provide a procedure for making buttons or the like characterized by a procedure which involves combining with a pellet of molding powder of the foregoing compositions, a predetermined design which is transferred and partially interfused by heat at the interfaces of the design and the preformed charge comprising the pellet and before molding the charge, the interface of design and preformed charge or pellet is heat treated, to fix the design so that the interfused design on the pellet is incapable of substantial distortion by being rendered partially infusible, in the nature of a case hardening treatment of the face carrying the design. The intermediate preformed charge or product so treated may then proceed to be treated to a variety of molding operations to retain the decorative design of predetermined outline substantially free from distortion. The selection of mold contours restraining flow in the plane of the design by the relative position of the parting line to the mold charge has, in accordance with my invention, been found to produce the desired degree of contour of the decorative design, with high lustre and with a long wearing abrasively resistant, ornamental surface.

Still more particularly it is an object of this invention to provide the button or like molded product from thermo-setting synthetic resinous materials, such as the potentially reactive phenol aldehyde resins, urea resins, melamine resins, impressed with a highly decorative ornamental surface which may be applied by printing methods, and to finally shape the charge of such material to the infusible state without destroying or distorting the predetermined contour of the decorative design, and to carry out such molding operations economically with regard to the period of time that the charge is in the mold, for curing the synthetic resinous material to the permanently infusible, thermally irreversible condition.

To attain these objects and such further objects as may appear herein or be hereinafter pointed out, I make reference to the accompanying drawings, forming a part hereof, in which—

FIGURE 1 is a perspective view showing an intermediate charge of preformed material;

FIGURE 2 is a perspective view of the sheet carrying the graphic outline of ornamental material;

FIGURE 3 is a magnified sectional view of the sheet carrying the transferable decorative design;

FIGURE 4 is a diagrammatic sectional view to illustrate the heat transfer procedure;

FIGURE 5 is a perspective view of the intermediate product;

FIGURE 6 is a magnified view of the apparatus for carrying out an intermediate step;

FIGURE 7 is a magnified sectional view of the product after the initial step;

FIGURE 8 is a perspective view of the facing charge or pellet;

FIGURE 9 is a longitudinal sectional view through the mold;

FIGURE 10 is a perspective view of the resultant product;

FIGURE 11 is a longitudinal sectional view taken on the line 11—11 of FIGURE 10;

FIGURES 12 and 13 are longitudinal cross-sectional views of apparatus for illustrating another embodiment of this invention.

Making reference to the drawing, in one embodiment of my invention I provide a pellet or pill 10 made from known molding powder and comprising a filler of relatively inert material uniformly blended with pulverized, potentially reactive synthetic resinous material, which charge under heat and pressure is capable of being molded to the thermally infusible state. The preformed pellet is capable of conforming to mold outline under fusion conditions of heat and pressure to take on a new shape. The pellet 10 has one or preferably both opposed faces 11 and 12 flat in the illustration given, for purposes which will appear as this description proceeds.

The graphic design of decorative outline which is selected by me is one which is impressed upon a temporary carrier 13 comprising paper, cellophane or like separable sheeting. The ornamental, decorative design 14 which is illustrated is characterized by its open work or permeable structure in that the opaque segments 15 are not impermeable or continuous but are set up in contrasting relation to the heat fusible and transferable coating 16. The decorative design 14 may be made of pulverized metal such as bronze, silver, gold or like metal foils of these metallic materials or opaque mineral pigments, to provide the graphic outline of decorative nature or an emblem, monograms, insignia of discontinuous outline within the face of the button. The combination of carrier resinous coating and the graphic decorative design of open structure will be hereinafter referred to the predetermined design. The combination of sheeted carrier 13 and coating 14 of the predetermined design will be referred to as the transfer in that the layer 14, under the application of heat and pressure with which the transfer may be contacted, will respond to cause a separation where the contacting surface is compatible to the resinous coating 14 in which the predetermined design is a part.

With the transfer as provided, the pellet 10 is suitably supported on a supporting base 17 to rest on its face 11 and over the opposed face 12 the carrier 13 is superimposed, to bring the coating 14 in contact therewith. Thereupon a plunger 18 carrying a heated iron is applied to the transfer. A transfer temperature prescribed for fusing the coating material is employed, which will cause a partial interfusion for preferential adhesion of the interfaces of the layer 14 and the face 12 of the pellet 10, sufficient upon withdrawal of the plunger 18 with the carrier sheet 13 to cause a separation of the predetermined design and the carrier 13.

After this initial treatment, the pellets 10 are continuously fed and applied to a hot plate 19 which is heated from 250° to 340° F. The pellet 10 is superimposed to bring only the layer 14 carried thereby in contact with the hot plate, leaving the opposed face unreacted. The period of time of exposure is calculated to convert the superficial coating of predetermined design and the interface to the infusible state without altering the moldability of the remainder or body of the pellet 10. A treatment of from one-half to one minute, within the temperature range of 250° to 340° has been found to be suitable, the time treatment being inversely related to the temperatures designated and the synthetic resinous material of the pellet.

The pellet, so treated and having the heat-set coating of predetermined design, yields differentially to heat and pressure molding operations which are calculated to shape the pellet within the contiguous portions of a mold designed to give it the ultimate contour which, in the illustrated form, is designed to make a shank button. The illustration in FIGURE 7 has the shaded area 20 intended to show an interfacial fusion which more or less case-hardens the pellet but is limited to the face 12 carrying the predetermined design.

The molding powder for making the pellet 10 has been chosen to provide a composition which will respond to subsequent manufacturing operations, particularly those involved in making buttons in which drill holes may be made or the button subjected to other machining operations, such as tumbling or cleaning up, without fracturing the body of the material as a result of such machine treatments. Such compositions are not greatly resistant to abrasion and the article in the form of a button may soon become dull and lose its desirable decorative effect, particularly when subjected to repeated laundering operations. To render the face carrying the predetermined design more resistant to the various manipulative treatments to which the button may be subjected or in use, it is contemplated by me to provide a facing of transparent or translucent material which is more durable. For this purpose a pellet 21 is preformed from a molding power, a mixture in which the components are calculated under the curing treatment of heat and pressure to result in a thermally irreversible, infusible layer which is translucent or transparent for revealing the decorative design. The compositions for this purpose are well known in the field for making thermo-set products from the phenol aldehyde resins, the urea aldehyde reaction products or melamine reaction products by an appropriate proportioning of the potentially reactive resinous material, with or without fillers.

The pellet 21 may be a disk whose edge 22 conforms with close tolerance to the perimeter of the button to be formed and the opposed faces may be flat. For a button which is to have a diameter of about .575", the pill forming the facing layer is about .550" in diameter. This will indicate an undersize tolerance of about .025". While close tolerance of the pellet in respect of the width of the mold cavity alone may minimize the undesirable distortion of the predetermined design, it is preferred by me to provide the pellet to form the facing 21 with a pre-shaped face 23 comprising a central segment 24 and a border 25 of differential lenticular outline closely conforming to the button 26 shown in FIGURE 10, having a centrally depressed and arched face 27 and a ridged protective border 28, which has a differential reflection and refractive effect on the underlaying decorative material. The pellet 21 is made symmetrical in respect of the foregoing configuration on its opposed face 29, for purposes which will appear presently.

With a charge comprising the initially treated pellet 10 with its aforedescribed case-hardened face 20 and the pellet of facing material shown in FIGURE 8, I provide a mold 30 having a mold cavity 31 whose side walls 32 have close tolerance with regard to the rim 22, as previously described. The bottom wall 33 is shaped to conform to the pellet with regard to the central segment 24 and the border 25, and designed to furnish a button edge and face as illustrated in FIGURE 10 with regard to the segments 26, 27 and 28. The depth of the mold below the edge 34 is calculated to be above the preshaped pellet face 23, and yet receive the preshaped pellet 10 carrying the case-hardened face 20 so that the parting line 35 will always be disposed within the mold cavity 31 and below the edge 34 upon executing the steps of heat and pressure for fusion and molding.

The male segment 36 of the mold is contoured to form the rear face of the molded button which, in the illustration, comprises a cavity 37 to form the shank portion 38 of the button illustrated in FIGURES 10 and 11. The outline of the plunger at its periphery 39 is calculated to interfit the side walls 32 so that the perimeter of the charge adjacent the edge of the parting line of the ornamental portion 20 is within the mold cavity, further restraining any distortion. The mold segments are furnished with the requisite heating means 40 and 41, graphically shown in FIGURE 9, to provide heat to cause the initial plasticity and curing under the pressures prescribed with regard to the molding composition of the facing pellet 21 and the body pellet 10. Under the heat and pressure to which the components are subjected, plastic flow is largely, if not entirely, confined to the facing pellet 22 adjacent the rear face 23 and rearwardly of the case-hardened facing 20 which carries the decorative layer. Distortion in the width of the mold is minimized, if not completely eliminated, so that the design is not distorted, there being an interfusion or welding through the open structure spaces 16 of the design of facing pellet 21 and the body pellet 10, to integrate the compositions which may be employed in these two segments. Also, there may be a sufficient encapsulating of the decorative segment in the flow of the plastic material of the pellet 21 about the perimeter of the pellet 10 carrying the decorative design 14 during the plastic stages of the molding material to eliminate any sharp line of demarcation.

The time element for effecting fusion and setting of the molding powder has not been given, it being sufficient for those skilled in the art to know that a compression flash type mold is employed and that the time and temperature are varied in accordance with the compositions employed and the size of the charge in the mold. With urea aldehyde types of molding powder mixtures which have been converted to the preshaped pellet, the temperature may be as low as 240° F. For the phenolic aldehyde and melamine type of thermo-setting charges, the temperature may range from 350° to 400° F.

In the illustration given in FIGURES 8, 9 and 10, the preformed pellet 21 to form the facing layer has been described and illustrated as symmetrical on its opposed faces. This facilitates charging the mold cavity with this pellet, as well as what is believed to encourage a plastic flow of the contiguous facing of the overlying pellet rather than of the face with the decorative design 20. While the facing pellet may be shaped to provide grooves and lenticular outlines on its face, it is understood that a flat facing layer may be employed, and come within the broader spirit of the invention. Where a flat pellet is used for the facing layer, the nature of the decorative design should be selected to increase the openwork nature and increase its permeability to cause interfusion through the perforations. The resultant procedure assures an integration or welding of the moldable layers of the materials employed without fracture possibilities at the interfaces and furnishes a readily machinable or drillable segment, in addition to the selection of an opaque moldable charge accentuating the decorative coating and likewise permitting the decorative layer to be of economical depth, without sacrificing long life. The translucent or transparent facing coat is chosen to provide high luster and abrasive resistance conducive to long life in protecting the ornamental surface decorative layer.

While I have shown and have described a procedure wheerin the body of the pellet is preliminarily case-hardened with relation to the decorative facing transferred to it, I have found for the production of decorative effects which do not requir ethe optimum brilliancy of design or long life of the lustrous transparent or translucent facing layer that the decorative design may be applied and directly interfused to the face of the body-forming pellet 10 and eliminate the facing charge of transparent material. For this purpose I refer to FIGURE 12. In this embodiment a pellet 10a may be employed with a preliminary initial case-hardening at the face 20a thereof by the heat treatment as described in conjunction with the illustration shown in FIGURE 6. This case-hardening step, however, may be omitted where the manipulative procedure within the mold and under the practice hereinafter described is followed.

A disk of a carrier 13a having the decorative layer 14 is inserted within the mold cavity of the character described in conjunction with FIGURE 9. The decorative design is desirably confined to the central portion to leave the perimeter 13b of the fusible type of film forming material compatible to the pellet composition. The body pellet 10a under these circumstances is superimposed on the transfer to assure that the parting line is well below the edge 34 and the heat and pressure cycle is performed to mold the button to its prescribed contour in accordance with the type of molding powder which is employed. The heat and pressure cause plastic flow of the charge, to shape the charge to the desired contour. There is sufficient plastic flow between the openwork of the design to integrate or weld the decorative facing thereto without fracturing or distorting the decorative design layer. The removal of the plunger portion of the die leaves the carrier behind in the die cavity to be removable by an air blast.

An alternative procedure is illustrated in FIGURE 13 wherein the case-hardened pellet 10, carrying the interfused superficial decorative layer 20, as a result of the treatment in accordance with the illustration shown in FIGURE 6, may be directly charged into the mold cavity. Here again the depth of the die or mold cavity to retain the decorative layer below the parting line of the mold and with close tolerances as described permits the plastic flow under heat and pressure to cure the charge, without distortion of the decorative layer and to effect a welding of the decorative effect to the face of the charge by an intermingling of the thermo-setting compound within the openwork of the design, a feature which is particularly to be observed where the decorative layer is outlined by metal foil. Confining the ornamental design within the ridges permits an impermeable layer of design to be employed.

It will thus be observed that by the method and apparatus described, an interfused decorative layer of predetermined design may be given to moldable products made of thermo-setting resinous compositions and where the mold is employed which located the parting line well away from the face of the button, distortion of the predetermined decorative outline is minimized, especially where presetting of the interface between the decorative layer and the charge is effected by the procedure herein referred to as "case-hardening." A facing layer of translucent or transparent thermo-set composition of more abrasive resistant nature adds brilliancy as well as long life to the decorative layer. The form of the mold or die segments within the tolerance described permits flat faces as well as lenticular or faceted facing to be impressed upon the exposed surface of the charge.

Thus by my invention high lustre and a long wearing ornamental surface on the button or like moldable material are assured, retaining as a result of a multi-layered charge differential machinability of the main body of the molded article as compared with the facing.

Having thus described my invention and illustrated its use, what I claim as new and desired to secure by Letters Patent is—

1. The method of molding a thermo-setting batch from a moulding powder charge to provide on a localized portion an ornamental face which includes the steps of forming a substantially cold preshaped charge of a potentially reactive thermo-setting molding powder mixture, applying an open design by transfer means to a localized portion on a face, heating said localized portion of said charge partially to set and harden the localized portion, leaving the other portions unmodified and then positioning the charge so treated in the mold, and shaping the same under heat and pressure to cure and shape the charge to the outlines of the mold with respect to the partially set face portion so that the shaping is primarily extended to the other portions of said charge.

2. The method of molding a thermo-setting batch from a moulding powder charge to provide on a localized portion an ornamental face with a design outlining element which includes the steps of forming a preshaped charge of a potentially reactive thermo-setting molding powder mixture, applying a design to a localized portion by transfer means on a face, heating said localized portion of said charge partially to set and harden the localized portion, leaving the other portions unmodified and then positioning the charge so treated in the mold in contact with the design outlining element, and shaping the same to the mold under heat and pressure to cure the charge with respect to the partially set face portion so that the shaping is primarily extended to the other portions of said charge.

3. In the method of molding a thermo-setting batch of molding powder which has been preshaped to form a flat face pellet, the steps which include transferring a design thereto and preferentially setting said superficial face of the pellet in contact with a design of openwork leaving other portions primarily unmodified and molding the pellet in a die under heat and pressure to shape the pellet charge and cure the entire charge to the irreversible condition.

4. The method of molding and forming an ornamental face with a predetermined design from a molding powder mixture of thermo-setting resins from the class including phenol aldehyde condensation resins, urea aldehyde resins, melamine resins, responding to heat and pressure to be changed to a thermally irreversible condition, which includes the steps of preshaping a batch of such resinous molding powder in the absence of temperature changes, case-hardening said face of said charge only to leave other portions unmodified, and molding to shape the unmodified charge under heat and pressure to cure the mixture while including a predetermined design adjacent said preheated surface, the design in contact with the case-hardened face remaining unmodified by said molding step.

5. The method of thermo-setting a batch of pre-shaped molding powder to provide an ornamental face carrying a predetermined design which includes the steps of preshaping a molding powder mixture containing a charge of a potentially reactive synthetic resinous material while retaining its moldable, heat-setting properties to provide a flat face portion on the charge, transferring a predetermined design to superficially interfuse the design to said face of the charge, case-hardening the charge adjacent the face carrying the ornamental design to leave the main body of the charge substantially unaltered and shaping the charge under heat and pressure to cure the same to its infusible stage in contact with a second charge of a molding material whereby the final molding step overlays and cures a coating on the design carried by the first charge.

6. The method of molding a thermo-setting batch to provide an ornamental face having a predetermined design which includes the steps of preshaping a molding powder mixture containing a potentially reactive synthetic resin to provide a smooth face to said charge and potentially opaque, transferring a design by heat to said face to fuse the transferred design to said face at temperatures below that affecting the moldability of the mixture, heating the charge to locally set the face and provide a superficially heat cured condition to said charge adjacent said transferred design to resist flow and to leave the main body of the charge substantially unaltered to respond to molding, and then shaping the charge by welding under heat and pressure to cure the batch, said last molding step being carried out in the presence of a preshaped pellet of potentially reactive synthetic resin curable to a condition ranging from translucency to transparency to overlay said design with a protective layer.

7. The method of molding a thermo-setting batch to provide an irregularly contoured face carrying a predetermined design which includes the steps of forming a pellet of a molding powder mixture containing a potentially reactive synthetic resin settable to an opaque condition, to provide a flat face, transferring to such face said predetermined design by heat below setting temperatures, curing said face locally to provide a charge with differentially responsive moldable properties with respect to said face whereby the main body of the pellet has a greater degree of moldability than the face to which the design has been transferred and molding said charge under heat and pressure to shape the charge while leaving said face unaltered, then curing the charge in contact with a second preshaped charge, settable to a transparent condition to shape the main body of the first charge and second charge while retaining the face carrying the design substantially in its original condition.

8. A method in accordance with claim 7 wherein the charge in superficially cured adjacent the surface of contact of a transfer design which is of openwork structure.

9. A pellet for use in molding of thermo-setting, potentially reactive synthetic resinous material, comprising a compacted molding powder of thermo-setting potentially reactive synthetic having a predetermined openwork design on one face thereof, interfused to said face and superficially cured thereto, with the main body of the pellet substantially unaltered, whereby molding of the pellet to its desired shape will flow the charge, leaving the design undistorted.

10. A pellet for use in the molding of thermo-set, potentially reactive synthetic resinous material comprising a compacted molding powder of thermo-setting, potentially reactive synthetic resinous material, superficially cured, with the main body of the pellet substantially unaltered whereby molding of the pellet to the desired shape of the product will flow the charge, leaving the superficially cured portion undistorted.

References Cited in the file of this patent

UNITED STATES PATENTS

| | | |
|---|---|---|
| Re. 19,549 | Byck | Apr. 30, 1935 |
| 1,094,828 | Aylsworth | Apr. 28, 1914 |
| 1,742,516 | Mills | Jan. 7, 1930 |
| 1,950,196 | Slusher | Mar. 6, 1934 |
| 2,673,372 | Karnial | Mar. 30, 1954 |
| 2,797,180 | Baldanza | June 25, 1957 |
| 2,860,380 | Walker | Nov. 18, 1958 |
| 2,874,419 | May et al. | Feb. 24, 1959 |

UNITED STATES PATENT OFFICE
CERTIFICATE OF CORRECTION

Patent No. 3,057,017

October 9, 1962

Joseph Robert Sucher

It is hereby certified that error appears in the above numbered patent requiring correction and that the said Letters Patent should read as corrected below.

In the grant, lines 1 to 3, for "Joseph Robert Sucher, of Woodmere, New York," read -- Joseph Robert Sucher, of Woodmere, New York, assignor to Emsig Manufacturing Company, of New York, N. Y., a partnership, --; line 12, for "Joseph Robert Sucher, his heirs" read -- Emsig Manufacturing Company, their heirs --; in the heading to the printed specification, line 3, for "Joseph Robert Sucher, Woodmere, N. Y." read -- Joseph Robert Sucher, Woodmere, N. Y., assignor to Emsig Manufacturing Company, New York, N. Y., a partnership --.

Signed and sealed this 19th day of March 1963.

(SEAL)
Attest:

ESTON G. JOHNSON
Attesting Officer

DAVID L. LADD
Commissioner of Patents